United States Patent
Moore

[11] Patent Number: 6,098,817
[45] Date of Patent: Aug. 8, 2000

[54] DUAL PURPOSE DATA CARTRIDGE STORAGE PACK

[75] Inventor: Robert Allen Moore, Louisville, Colo.

[73] Assignee: Engineered Data Products, Inc., Broomfield, Colo.

[21] Appl. No.: 09/168,793

[22] Filed: Oct. 8, 1998

[51] Int. Cl.[7] .................................................. A47G 29/00
[52] U.S. Cl. ......................................................... 211/41.12
[58] Field of Search .................................. 211/40, 41.12; 312/9.1, 9.9; D6/407; 206/307.1, 387.1, 387.14, 387.15

[56] References Cited

U.S. PATENT DOCUMENTS

| | | | |
|---|---|---|---|
| 4,121,877 | 10/1978 | Brown | 211/40 |
| 4,235,490 | 11/1980 | Schwartz et al. | 211/41.12 |
| 4,317,603 | 3/1982 | Pepicelli et al. | 211/40 |
| 4,527,262 | 7/1985 | Manto | 369/33 |
| 4,730,735 | 3/1988 | Lechner | 211/41.12 |
| 4,846,355 | 7/1989 | Price, Sr. et al. | 211/41.12 |
| 4,850,485 | 7/1989 | Ishikawa | 211/40 |
| 5,000,526 | 3/1991 | Comerford | 211/41.12 |
| 5,072,835 | 12/1991 | Price, Jr. et al. | 211/41.12 |
| 5,103,986 | 4/1992 | Marlowe | 211/41.12 |
| 5,211,292 | 5/1993 | Paolucci | 211/40 |
| 5,253,246 | 10/1993 | Leonhardt et al. | 369/291 |
| 5,297,675 | 3/1994 | Martucci | 211/40 |
| 5,474,190 | 12/1995 | Won-Kim | 211/41.12 |
| 5,638,962 | 6/1997 | Price, Jr. | 211/41.12 |

Primary Examiner—Daniel P. Stodola
Assistant Examiner—Jennifer E. Novosad
Attorney, Agent, or Firm—Duft, Graziano&Forest, P.C.

[57] ABSTRACT

The dual purpose data cartridge storage pack serves to accommodate both individual data cartridges as well as data cartridge magazines that serve to store a plurality of data cartridges. This architecture enables the user to use the data cartridge storage pack interchangeably to thereby accommodate varying quantities of data cartridges and data cartridge magazines without loss of cartridge storage space occasioned by the dedication of data cartridge storage racks for a single type of media element. The data cartridges are the industry standard IBM Magstar data cartridges that can be individually stored in a data cartridge storage pack or placed in the IBM Magstar data cartridge magazine. The present dual purpose data cartridge storage pack is equipped with a plurality of data cartridge storage locations, each of which is adapted to receive a single IBM Magstar data cartridge. The dual purpose data cartridge storage pack is also adapted to receive at least one IBM Magstar data cartridge magazine in predetermined site(s) therein. Thus, the present dual purpose data cartridge storage pack can store either IBM Magstar data cartridges or an IBM Magstar data cartridge magazine in the same space, thereby enabling the dual purpose data cartridge storage pack to provide enhanced efficiency of data cartridge management

7 Claims, 3 Drawing Sheets

DUAL PURPOSE DATA CARTRIDGE STORAGE PACK

FIELD OF THE INVENTION

This invention relates to racks that are used to store data cartridges and, in particular, to a dual purpose data cartridge storage pack that is architected to accept both individual data cartridges as well as data cartridge magazines.

PROBLEM

It is a problem in the field of data cartridge storage racks to accommodate multiple types of data storage media elements. Data cartridge storage racks are typically located in a manual cartridge library system where human operators store and retrieve magnetic tape based data cartridges from the data cartridge storage locations contained within the data cartridge storage racks for use by a plurality of tape drives. Alternatively, the data cartridge storage racks are located in an automated cartridge library system, where a robotic mechanism is used to automatically store and retrieve magnetic tape based data cartridges from the data cartridge storage locations contained within the data cartridge storage racks for use by a plurality of tape drives. In either environment, the data cartridge library system must be homogeneous to enable the efficient management of the data cartridges and the data cartridge storage racks are therefore configured to store only a single type of data cartridge. Thus, these library systems are incapable of managing multiple types of data cartridges or data cartridges as well as data cartridge magazines.

An exception to these homogeneous library systems is illustrated in U.S. Pat. No. 4,527,262 wherein a plurality of disjunct library storage segments are used to accommodate multiple types of data storage media. This library system segments the library into mutually exclusive areas, each of which is equipped with a particular media storage rack that is designed to accept a predetermined type of media element. A difficulty with this library system is that the various library segments are incompatible and unused areas in one segment are not available for use for the storage of other types of media elements. This library segmentation results in the inefficient use of library resources.

Another solution to the use of multiple types of media is disclosed in U.S. Pat. No. 5,253,246, wherein a universal data storage element is used to present a uniform form factor data storage element to the library system. This system enables the user to vary the contents of the universal data storage element to thereby accommodate multiple types of media. A difficulty with this arrangement is that the universal data storage element adds a cost to each media element that is stored in the library system to obtain the uniformity of form factor that simplifies data cartridge management.

Thus, there is presently no data cartridge storage rack that can simply and economically accommodate multiple types of media elements. This is particularly a problem in the use of data cartridge magazines wherein a plurality of data cartridges are loaded by the operator into a data cartridge magazine for loading into an autoloader that is mounted on the tape drive. The need to manually load and unload the data cartridge magazine represents a significant additional cost of operation and is inconsistent with the efficient management of the data cartridge storage. The data cartridge magazines are typically used in conjunction with manual library systems, but conceptually can also be used with automated cartridge library systems.

SOLUTION

The above described problems are solved and a technical advance achieved by the present dual purpose data cartridge storage pack that serves to accommodate both individual data cartridges as well as data cartridge magazines that serve to store a plurality of data cartridges. This architecture enables the user to use the data cartridge storage pack interchangeably to thereby accommodate varying quantities of data cartridges and data cartridge magazines without loss of cartridge storage space occasioned by the dedication of cartridge storage packs for a single type of media element.

In the preferred embodiment disclosed herein, the data cartridges are the industry standard IBM Magstar MP Model B or C data cartridges (model numbers 05H2464 and 08L6187, respectively), for use in the IBM 3570 type tape drives, which data cartridges can be individually stored in a data cartridge storage pack or placed in the IBM Magstar data cartridge magazine, model number 49G6598. The present dual purpose data cartridge storage pack is equipped with a plurality of data cartridge storage locations, each of which is adapted to receive a single IBM Magstar data cartridge. The dual purpose data cartridge storage pack is also adapted to receive at least one IBM Magstar data cartridge magazine in predetermined site(s) therein. Thus, the present dual purpose data cartridge storage pack can store either IBM Magstar data cartridges or an IBM Magstar data cartridge magazine the same space, thereby enabling the dual purpose data cartridge storage pack to provide enhanced efficiency of data cartridge management.

DETAILED DESCRIPTION

The dual purpose data cartridge storage pack serves to accommodate both individual data cartridges as well as data cartridge magazines that serve to store a plurality of data cartridges. This architecture enables the user to use the data cartridge storage pack interchangeably to thereby accommodate varying quantities of data cartridges and data cartridge magazines without loss of cartridge storage space occasioned by the dedication of cartridge storage packs for a single type of media element. The data cartridges are the industry standard IBM Magstar data cartridges that can be individually stored in a data cartridge storage pack or placed in the IBM Magstar data cartridge magazine.

Figure 1:
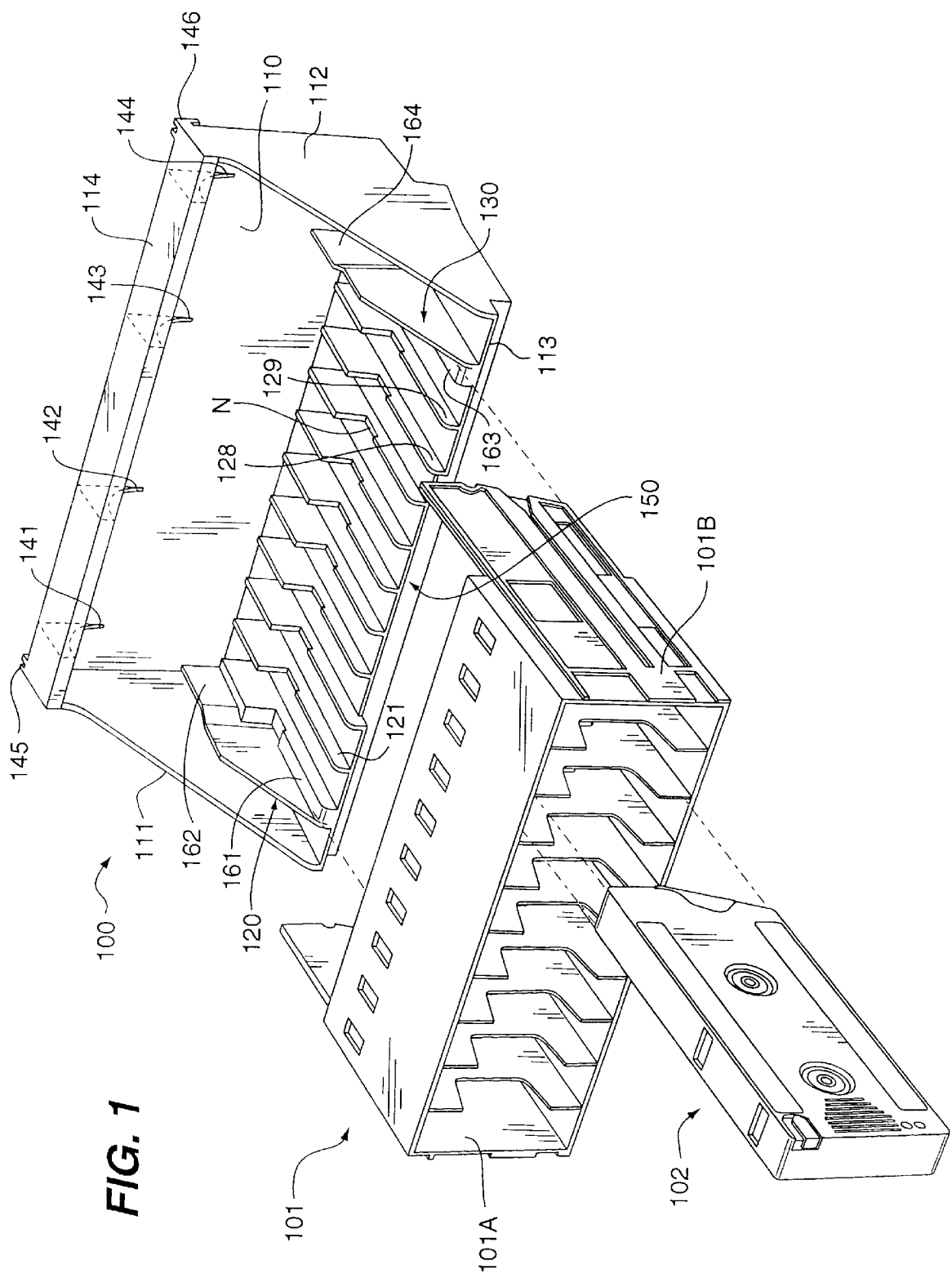
FIG. 1 illustrates in perspective exploded view the present dual purpose data cartridge storage pack, an IBM Magstar data cartridge magazine, and an IBM Magstar data cartridge.
Figure 2:
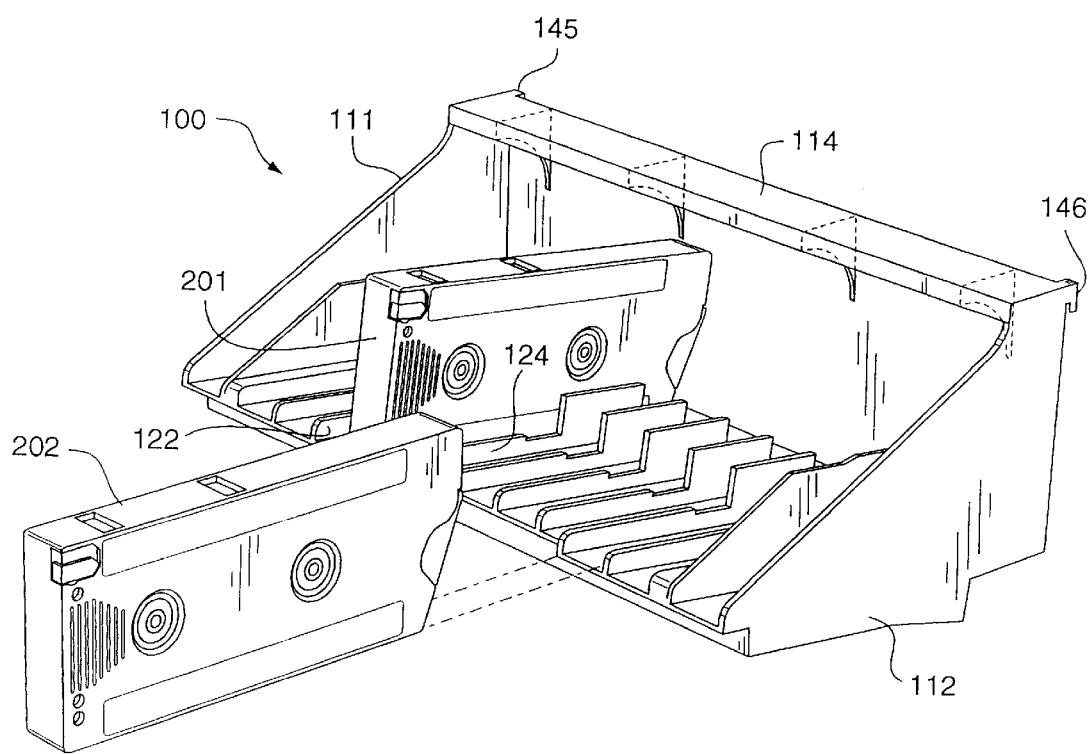
FIG. 2 illustrates in perspective view, the present dual purpose data cartridge storage pack with an IBM Magstar data cartridge stored therein.
Figure 3:
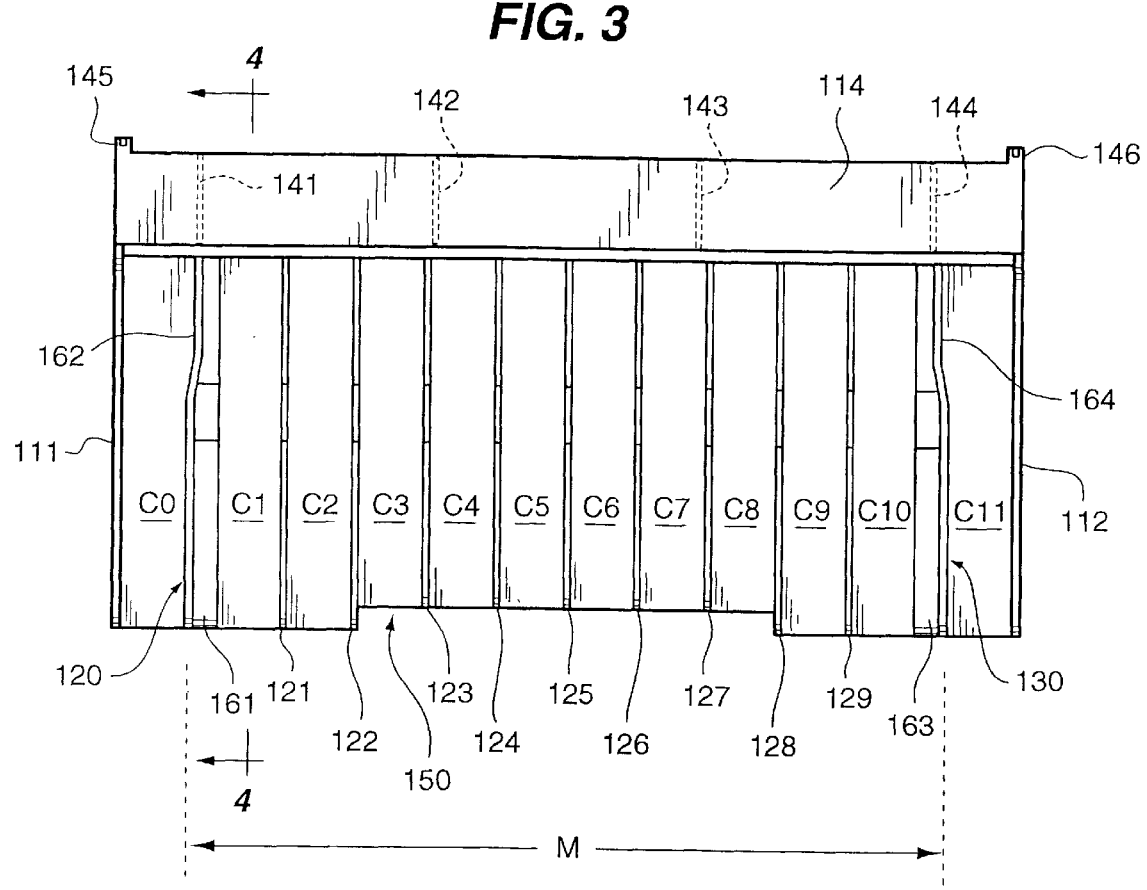
FIGS. 3 and 4 illustrate top plan and side cross-section plan views of the present dual purpose data cartridge storage pack.
Figure 4:
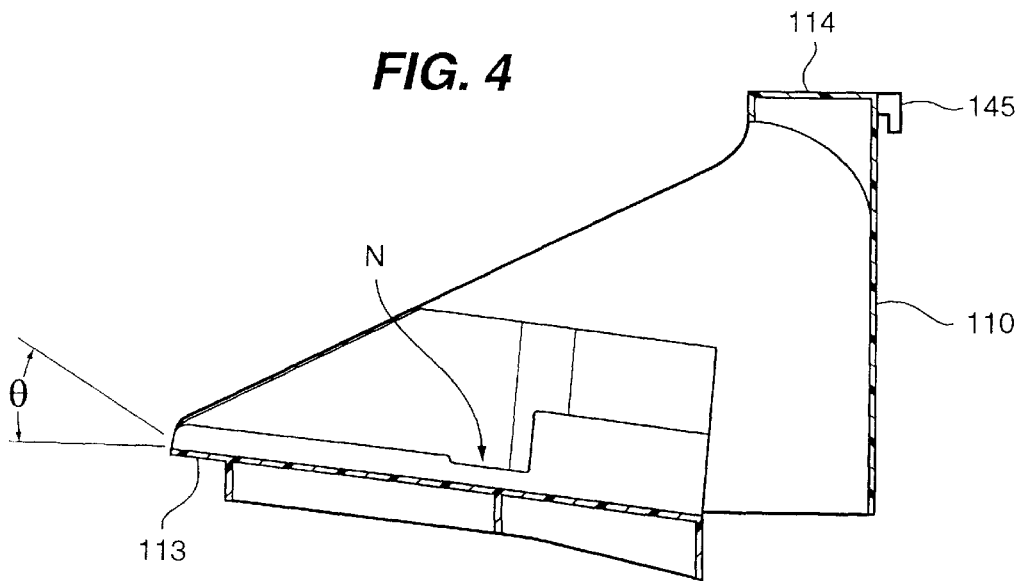

FIG. 1 illustrates in perspective exploded view the present dual purpose data cartridge storage pack 100, an IBM Magstar data cartridge magazine 101, and an IBM Magstar data cartridge 102 while FIG. 2 illustrates in perspective view, the present dual purpose data cartridge storage pack 100 with an IBM Magstar data cartridge 201 stored therein. FIGS. 3 and 4 illustrate top plan and side cross section plan views of the present dual purpose data cartridge storage pack. The dual purpose data cartridge storage pack 100 is also referred to as a "Magstar Data Cartridge Storage Pack" and comprises a body that includes a back surface 110 that is equipped with a plurality of features 145, 146 that are used to mount the dual purpose data cartridge storage pack 100 on a rack (not shown) in the cartridge library system. The rack comprises a Multi-Media Data Storage Rack manufactured by Engineered Data Products, Inc. and comprises a sheet metal assembly that functions to support a large number Magstar Data Cartridge Storage Packs. The features 145, 146, as shown, are hook-like elements that enable the dual purpose data cartridge storage pack 100 to be hung from a support member on a library rack. The body also includes first and second ends 111, 112 that serve to support the base member 113 of the dual purpose data cartridge storage pack 100 as well as provide sides for the two endmost of the data cartridge storage locations C0–C11. The first 111 and second 112 ends are shaped to maintain the base member 113 at a slight angle Ø from the vertical when the dual purpose data cartridge storage pack 100 is mounted in a library system. The slight angle Ø realizes a downwardly sloping data cartridge storage location such that the data cartridge is biased toward the back of the data cartridge storage location on an angle of up to 10° to thereby resist movement of the data cartridge placed therein and data cartridges placed in said data cartridge storage locations are precisely positioned therein by the force of gravity.

The base member 113 also has formed therein a plurality of ribs 120–130 that serve to delineate the data cartridge storage locations C0–C11. The ribs 120–130 function in a well-known manner to support a data cartridge 201 that is placed between the two adjacent ribs 123, 124 that form the two sides of a data cartridge storage location C4. The plurality of ribs 120–130 are oriented in a substantially parallel, spaced apart relationship to form, in the preferred embodiment illustrated herein, twelve side-by-side data cartridge storage locations C0–C11. The number of data cartridge storage locations can be varied to accommodate the needs of the cartridge library system. In addition, the number of data cartridge magazines 101 that can be stored in a dual purpose data cartridge storage pack 100 can be either one, as shown in FIGS. 1–4, or a plurality by simply increasing the extent of the dual purpose data cartridge storage pack 100 to enable the placement of multiple data cartridge magazines 101 therein. The placement of a typical IBM Magstar data cartridge 201, 202 into one of the data cartridge storage locations C4 is illustrated in FIG. 2. The ribs 120–130 also provide a predetermined amount of space between adjacent data cartridges to enable a user to grasp the exposed end of the data cartridge 201 and remove same from its data cartridge storage location.

The ribs 120–130 illustrated in FIGS. 1–4 comprise two sets of ribs, a first set of which 121–129 are used to separate IBM Magstar data cartridges 201 and a second set of which 120, 130 are used to either separate IBM Magstar data cartridges 201 or to accommodate an IBM Magstar data cartridge magazine 101. In particular, each rib (rib 128 for example) in the first set of ribs 121–129 includes a notch N formed in the top side thereof to receive a corresponding feature that is formed on the base member of the IBM Magstar data cartridge magazine 101. The primary use of notch N is to provide an extra margin of safety "step" to resist movement of the data cartridge magazine 101 in the event of an earthquake. The secondary purpose of notch N is to resist movement of the IBM Magstar data cartridge magazine 101 when it is placed in the space delineated by the arrow M on FIG. 3. The two ribs 120, 130 in the second set of ribs comprise the first and second sides of the IBM Magstar data cartridge magazine "slot" M and are of dimensions and configuration to accommodate either an IBM Magstar data cartridge 201 or an IBM Magstar data cartridge magazine 101. In particular, the IBM Magstar data cartridge magazine 101 has end walls 101A, 101B that serve to enclose the data cartridges 102 contained therein. These end walls 101A, 101B also include features that are used by the IBM 3570 tape drive autoloader. To account for these additional thicknesses of material, the ribs 120, 130 include a shelf 161, 163 respectively, to both support the respective IBM Magstar data cartridge magazine end walls 101A, 101B or act as a divider (analogous to the operation of the ribs 121–129 in the first set) when the data cartridge location is used to store an individual data cartridge 201. The ribs 120, 130 also include a tapered wall 162, 164 respectively, that functions to both guide and center the IBM Magstar data cartridge magazine 101 in slot M as well as to place an inwardly directed pressure on the rearmost portion of the end wall 101A, 101B, of the IBM Magstar data cartridge magazine 101, when the IBM Magstar data cartridge magazine 101 is fully inserted into slot M. These rearmost portions of the end walls 101A, 101B of the IBM Magstar data cartridge magazine 101 have a certain amount of flexibility and can be deformed a slight amount by the interaction of the tapered wall 162, 164 against the rearmost portion of the end wall 101A, 101B, to thereby resist movement of the IBM Magstar data cartridge magazine 101 once it is placed into slot M.

The dual purpose data cartridge storage pack 100 also includes a lip 114 that extends across the top of the back 110 thereof, extending outwardly from the back 110. The lip 111 both provides additional rigidity to the dual purpose data cartridge storage pack 100 as well as providing a dust cover over the exposed ends of the data cartridges 201 that are loaded into the IBM Magstar data cartridge magazine 101. As shown herein, a plurality of support members 141–144 are provided to support the lip 114 along its length. Furthermore, an indent 150 is formed in the front edge of the base member 113 of the dual purpose data cartridge storage pack 100 to thereby enable an operator to grasp the front of the IBM Magstar data cartridge magazine 101 when it is loaded into slot M.

What is claimed:

1. A dual purpose data cartridge storage pack for the storage of both data cartridges and data cartridge magazines comprising:

a substantially rectangular shaped structure, having first and second ends and a base member interconnecting said first and said second ends, said substantially rectangular shaped structure having a substantially open front face;

a plurality of horizontally spaced, parallel ribs mounted on a top surface of said base member and located between said first and said second ends to form a plurality of data cartridge storage locations; and a first one of said ribs and a second one of said ribs being spaced apart within said plurality of ribs to form a slot configured to receive a data cartridge magazine, wherein said first one of said ribs is wider than said plurality of ribs to form a first shelf on said first one of said ribs and said second one of said ribs is wider than said plurality of ribs to form a second shelf on said second one of said ribs, said first shelf and said second shelf being configured to support said data cartride magazine when said data cartridge magazine is loaded into said slot.

2. The dual purpose data cartridge storage pack of claim 1 further comprising:

a back member interconnected between said first and second ends and connected to said base member to further define said substantially rectangular shaped structure, wherein said interconnection of said base member, said back member and said first and said second ends creates a downward slant to said data cartridge storage locations.

3. The dual purpose data cartridge storage pack of claim 2 further comprising:
   a plurality of support members attached to said back member of said substantially rectangular shaped structure for enabling the mounting of said dual purpose data cartridge storage pack on a cartridge library frame member.

4. The dual purpose data cartridge storage pack of claim 1 wherein said first and said second one of said ribs comprise:
   a tapered wall, wherein said first shelf and said second shelf form a wall of a first and a second one of said data cartridge storage locations and each said tapered wall forms a wall of said slot.

5. The dual purpose data cartridge storage pack of claim 4 wherein said tapered wall contacts a corresponding end wall of said data cartridge magazine to resist movement of said data cartridge magazine when said data cartridge magazine is loaded into said slot.

6. The dual purpose data cartridge storage pack of claim 1 wherein said slot spans a plurality of said data cartridge storage locations, each of said ribs located in said slot includes:
   a notch for mating with a corresponding feature on said data cartridge magazine to resist movement of said data cartridge magazine when said data cartridge magazine is loaded into said slot.

7. The dual purpose data cartridge storage pack of claim 1 wherein said base member further comprises:
   an indent formed in a front edge thereof to enable grasping of said data cartridge magazine when said data cartridge magazine is loaded into said slot.

\* \* \* \* \*